United States Patent [19]
Yamamoto et al.

[11] Patent Number: 6,004,085
[45] Date of Patent: Dec. 21, 1999

[54] SELF-DRILLING ANCHOR

[75] Inventors: Hisayoshi Yamamoto; Takayuki Sato, both of Kawachinagano, Japan

[73] Assignee: Yamahiro Co., Ltd., Osaka, Japan

[21] Appl. No.: 08/983,638

[22] PCT Filed: Jun. 16, 1997

[86] PCT No.: PCT/JP97/02072

§ 371 Date: Jan. 28, 1998

§ 102(e) Date: Jan. 28, 1998

[87] PCT Pub. No.: WO97/48911

PCT Pub. Date: Dec. 24, 1997

[30] Foreign Application Priority Data

Jun. 19, 1996 [JP] Japan ................................... 8-179923

[51] Int. Cl.$^6$ ............................. F16B 13/04; F16B 13/06
[52] U.S. Cl. ..................... 411/30; 411/60.1; 411/387.5
[58] Field of Search ................................ 411/29, 30, 31, 411/60, 387, 60.1, 387.1, 387.5

[56] References Cited

U.S. PATENT DOCUMENTS

| | | | |
|---|---|---|---|
| 4,322,194 | 3/1982 | Eirhorn | ..................................... 411/30 |
| 4,601,625 | 7/1986 | Ernst et al. | ........................... 411/29 X |
| 5,190,425 | 3/1993 | Weider et al. | ......................... 411/29 X |
| 5,692,864 | 12/1997 | Powell et al. | ............................. 411/30 |

FOREIGN PATENT DOCUMENTS

| | | | |
|---|---|---|---|
| 4-827855 | 8/1973 | Japan . | |
| 58-13215 | 1/1983 | Japan . | |
| 5-865416 U | 5/1983 | Japan . | |
| 59-183513 U | 12/1984 | Japan . | |
| 61-1709 U | 1/1986 | Japan . | |
| 2-142909 | 6/1990 | Japan | ..................................... 411/29 |
| 6-213219 | 8/1994 | Japan . | |

*Primary Examiner*—Neill Wilson

[57] ABSTRACT

A self-drilling anchor having a self-drilling function includes a body and a pin. The body includes a head and a shank extending from the head downward. The head is of a shape similar to the head of a hexagonal bolt such that the head may engage with the rotary member of an electric rotary tool. The shank is in the form of a column having a constant outer diameter, having helical grooves formed on its outer periphery. The body includes in its core an opening portion with a constant inner diameter extending from the upper end toward the top end. A slit is formed on the top end portion of the shank to extend from its tip to the opening portion so as to divide the top end portion into two. The slit is engaged with the drilling edge to hold it. Completion of a self-drilling anchor is achieved by fitting the pin into the opening portion of the body.

9 Claims, 9 Drawing Sheets

FIG.3
(A)
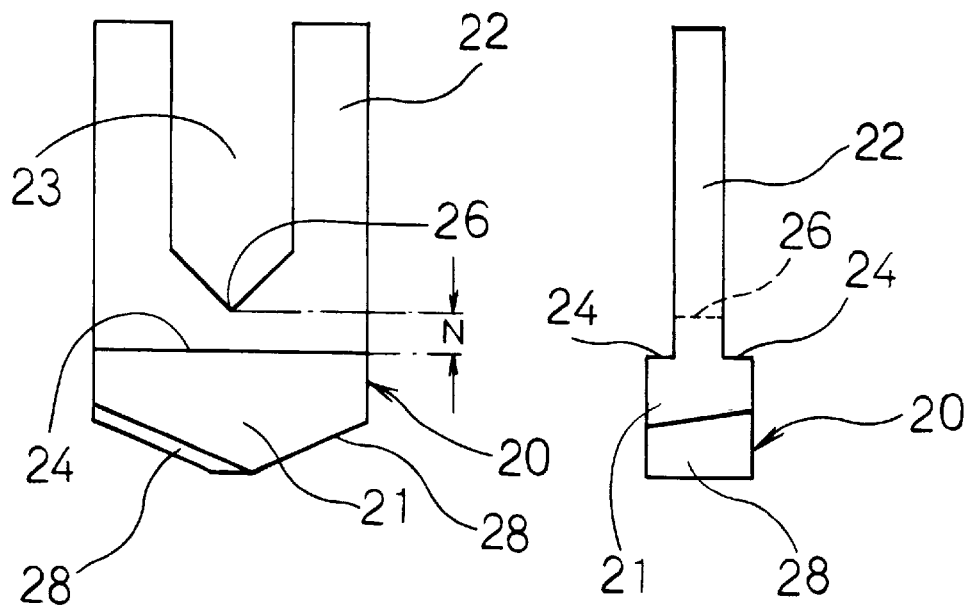
(B)
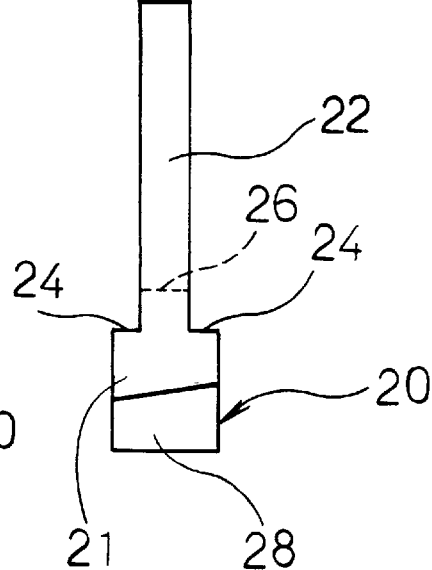
(C)
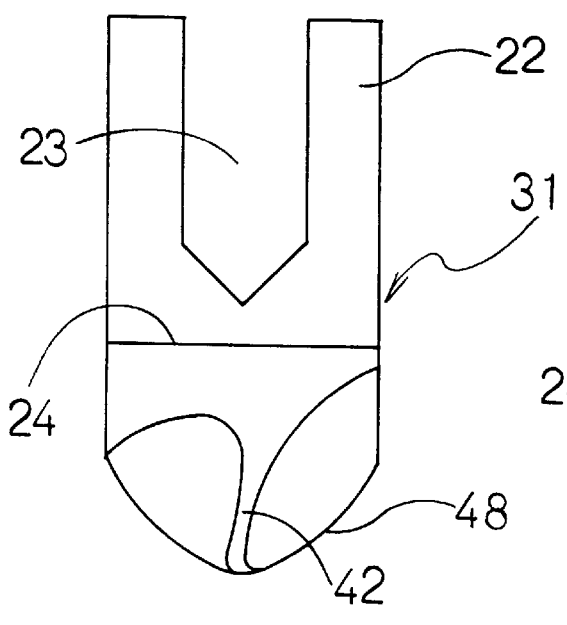
(D)
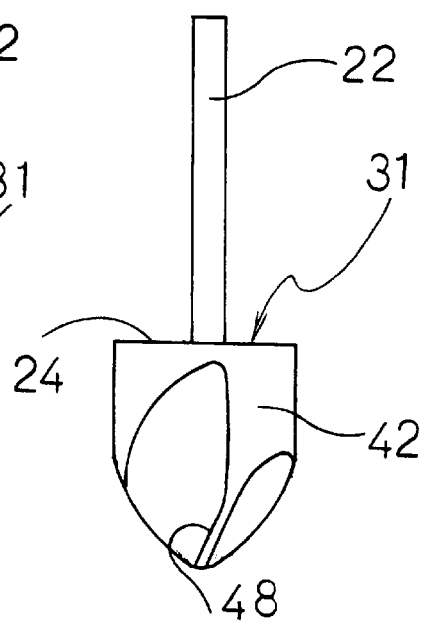

FIG.9 CONVENTIONAL ART
(A)
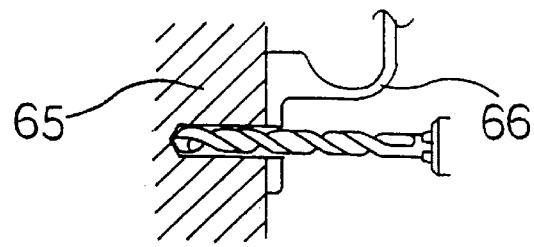
(B)
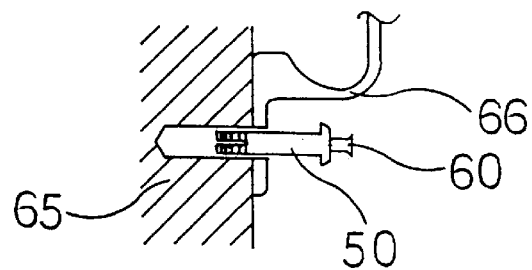
(C)
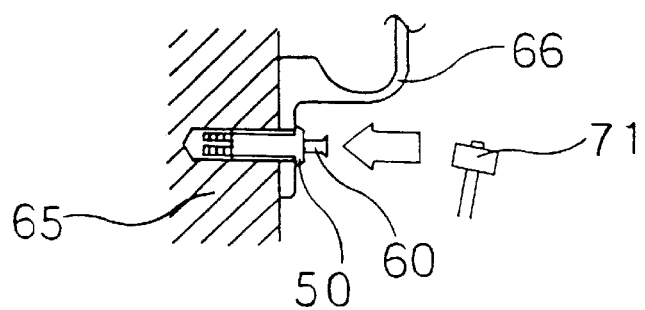
(D)
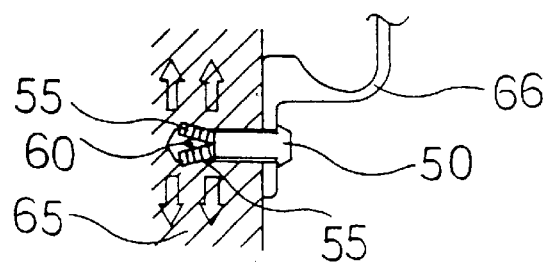

SELF-DRILLING ANCHOR

This application is the national phase under 35 U.S.C. §371 of prior PCT International Application No. PCT/JP97/02072 which has an International filing date of Jun. 16, 1997 which designated the United States of America, the entire contents of which are hereby incorporated by reference.

TECHNICAL FIELD

BACKGROUND OF THE INVENTION

The present invention relates to an anchor such as anchor pin or an anchor bolt for use in mounting and securing various types of fixtures such as metal fittings onto structures such as concrete, bricks or blocks, etc., particular, the present invention relates to a self-drilling anchor which is capable of drilling starting holes by itself.

BACKGROUND ART

Conventional methods of mounting and securing various types of fixtures such as metal fittings onto structures such as concrete, bricks or blocks, etc., involve driving in anchor bolts or anchor pins before the cure of concrete, post-anchoring to be performed after the cure of concrete, and driving in pins under the influence of powders. The present invention relates to the post-performance of anchoring.

The exemplary conventional post-performance of anchoring includes a process comprising steps of drilling a starting hole to a predetermined depth by the use of concrete drills having a prescribed diameter, then driving in an anchor pin, and spreading the top end portions of the anchor pin wider than the inner diameter of the starting hole for retention against draw force. In addition another process includes inserting adhesives and an anchor into a starting hole so as to enable the adhesives to protect the anchor against any draw force for retention.

For example, FIG. 8 shows a conventional anchor pin; FIG. 8(A) is a front view, FIG. 8(B) a central longitudinal section view, FIG. 8(C) a plan view, FIG. 8(D) a bottom plan view, and FIG. 8(E) a front view of the pin.

This particular anchor pin consists of a body 50 and a pin 60. The body 50 is composed of a head 51 provided on an upper base end, and a shank 52 extending from the head 51 downward. The outer diameter of the head 51 is larger than that of the shank 52. The outer diameter of shank 52 is substantially constant in size throughout its entire length.

An opening portion 53 for receiving a pin 60 is formed in the head 51, and the center of the shank 52 to extend from the upper end at the base end portion side to a proper place at the lower end side. The inner diameter of the opening portion 53 has a larger section formed to receive the head 61 of the pin 60 and another section formed constant in size for receiving the shank 62 of the pin 60.

The lower end portion of the shank 52 is formed with a constant length of slit 54 so that it may divide the tip of the shank 52 into two (FIG. 8(D)). The slit 54 extends from the tip of the shank 52 to the opening portion 53.

A plurality of annular grooves 56 are formed in the outer periphery of the top end portion of the shank 52.

The pin 60 which is to be fitted into the opening portion 53 of the body 50 is constituted by a head 61 of larger diameter disposed on the upper base end portion and a shank 62 having a constant outer diameter extending downward. The shank 62 has a tapered lower end portion in the shape of a pointed needle. When this pin 60 is fitted into the opening portion 53 of the body 50 and driven by a hammer etc., the slit-forked top end portions 55, 55 of the body 50 are spread to securely fit the anchor to a structure with a subsequent fixation of a fixture on the structure. FIG. 9 is a schematic illustration showing an exemplar use of said anchor pin. The procedure is as follows.

As illustrated by FIG. 9(A), a starting hole is drilled using an electric drill through metal fittings 66 to be secured to a structure 65 such as concrete etc.

Referring to FIG. 9(B), the anchor pin with the pin 60 fit into the opening portion of the body 50 is placed in said starting hole.

In FIG. 9(C), the pin 60 is driven by a hammer 71.

In FIG. 9(D), the driven pin 60 may induce the spreading of the slit-forked top end portions 55, 55 so that the anchor and the metal fitting 66 will be secured to the structure 65.

In addition to said anchor pin, the anchor also involves an anchor bolt not having a head 51 but a single shank 52 and threads formed in the latter on the outer periphery of the upper end portion. With this anchor bolt, after it has been secured to a structure, a fixture can be securely fixed to the structure by a nut etc.

As described above, the conventional anchor requires drilling of starting holes by means of an electric drill such as a concrete drill and adjustment so as to secure exact positional correspondence between the fixture and the structure, which may make the operation complicated, requiring trouble and time, and skill as well.

SUMMARY OF THE INVENTION

The task of the present invention is to provide an anchor which can drill a starting hole into a concrete structure and a fixture and secure the fixture to the structure. In other words, the task of this invention is to provide a self-drilling anchor wherein anchoring and drilling can be performed at the same time to ensure that drilling of holes in fixtures and structures and securing of the fixtures to the latter will be surely and efficiently executed.

For the purpose of solution of the above mentioned task, an anchor in accordance with a first aspect of the present invention of comprises a shank 12, an opening portion 15 formed in the core of the shank 12 extending from the base end of the shank 12 toward the top end of the shank 12 by a proper length for receiving a pin 1, and a slit 16 formed in the top end of the shank 12 to extend from its tip to said opening portion 15, whereby the anchor may be securely fixed to a structure such as concrete by fitting said pin 1 in said opening portion 15, and driving the pin 1 until the slit 16 will be spread, wherein the shank 12 may be engaged by the base end portion with the rotary member of a rotary tool, and the shank 12 has at the top end drilling edges 20, 25, 31 which are adapted to drill holes into the structure etc.

An anchor in accordance with a second aspect of the present invention of comprises a shank 12, an opening portion 15 formed in the core of the shank 12 extending from the base end portion of the shank 12 toward the top end portion of the shank 12 by a proper length for receiving a pin 1, and a slit 16 formed in the top end portion of the shank 12 to extend from its tip to said opening portion 15, whereby the anchor may be securely fixed to a structure such as concrete etc., by fitting said pin 1 in said opening portion 15, and driving the pin 1 until the slit 16 is spread, wherein the shank 12 may be engaged by the base end portion with the rotary member of a rotary tool, and drilling edges 20, 31 may be received by the slit 16 formed in the top end portion of the shank 12 to drill a starting hole into the structure etc., by the rotary motion.

In accordance with the first and second aspects of the present invention, because of the drilling edges 20, 25, 31 disposed in the top end portion of the shank 12, a starting hole may be drilled by driving the anchor using an electric rotary tool into a fixture placed in position in the structure, and then the pin 1 fit in the opening portion 15 in the core of the shank 12 is so driven as to urge the slit 16 mounted in the top end portion of the shank 12, namely the top end portion of the shank 12 to spread until the anchor is securely fixed to the structure.

In accordance with a third aspect of the present invention there are provided cutting edges 28, 48 in the lower end portions of the drilling edges 20, 31 and cutout 23 formed in the upper base end portion to originate substantially from the center portion to extend downward by a proper length, with the drilling edges 20, 31 being received for retention by the slit 16 at the base end portion side and the cutout 23 being located within the silt 16 so that the top end of said pin 1 may intrude into the cutout 23.

This makes it possible to allow the drilling edges 20, 31 received by the slit 16 of the top end portion of the shank 12 to efficiently drill starting holes into the fixtures and structures, thereby enabling proper pin drive without any difficulty due to the existence of the cutout 23 on the drilling edges 20, 31.

Since the cutout 23 is placed within the slit 16, there will be no risk of drilling edges 20, 31 being broken down by the top end portion of the shank 12, such that the strength of the drilling edges may be sufficiently maintained.

In accordance with a fourth aspect of the present invention drilling edge 25 is formed directly in the top end portion of the shank 12.

In the fourth aspect of the present invention, the same action as in the first and second aspects of the present invention may be achieved, and the formation of the drilling edges 25 immediately on the top end portion of the shank 12 may save the trouble to combine a drilling edge 20 formed in a separate object with the shank 12 of the anchor as in the second and third aspects of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 shows another embodiment of the drilling edge in accordance with the present invention; (A) is a front view of a plate-like drilling edge for use in the embodiment as shown by FIG. 1, (B) a side view of the same, (C) a front view of the drilling edge of other embodiment, and (D) a side view of the same;

FIG. 9 is a schematic illustration of an example of use of the conventional anchor pin as shown by FIG. 8; (A) shows the state in which a starting hole is being drilled into a fixture and a structure by an electric drill, (B) the state in which the anchor pin is set in the starting hole, (C) the state in which the anchor pin is driven, and (D) the state in which the anchor and the fixture have been securely fixed to the structure.

DESCRIPTION OF THE PREFERRED EMBODIMENTS

Now the embodiments of the present invention will be described with reference to the accompanying drawings. FIGS. 1 to 7 illustrate the embodiments of the present invention.

Figure 1:
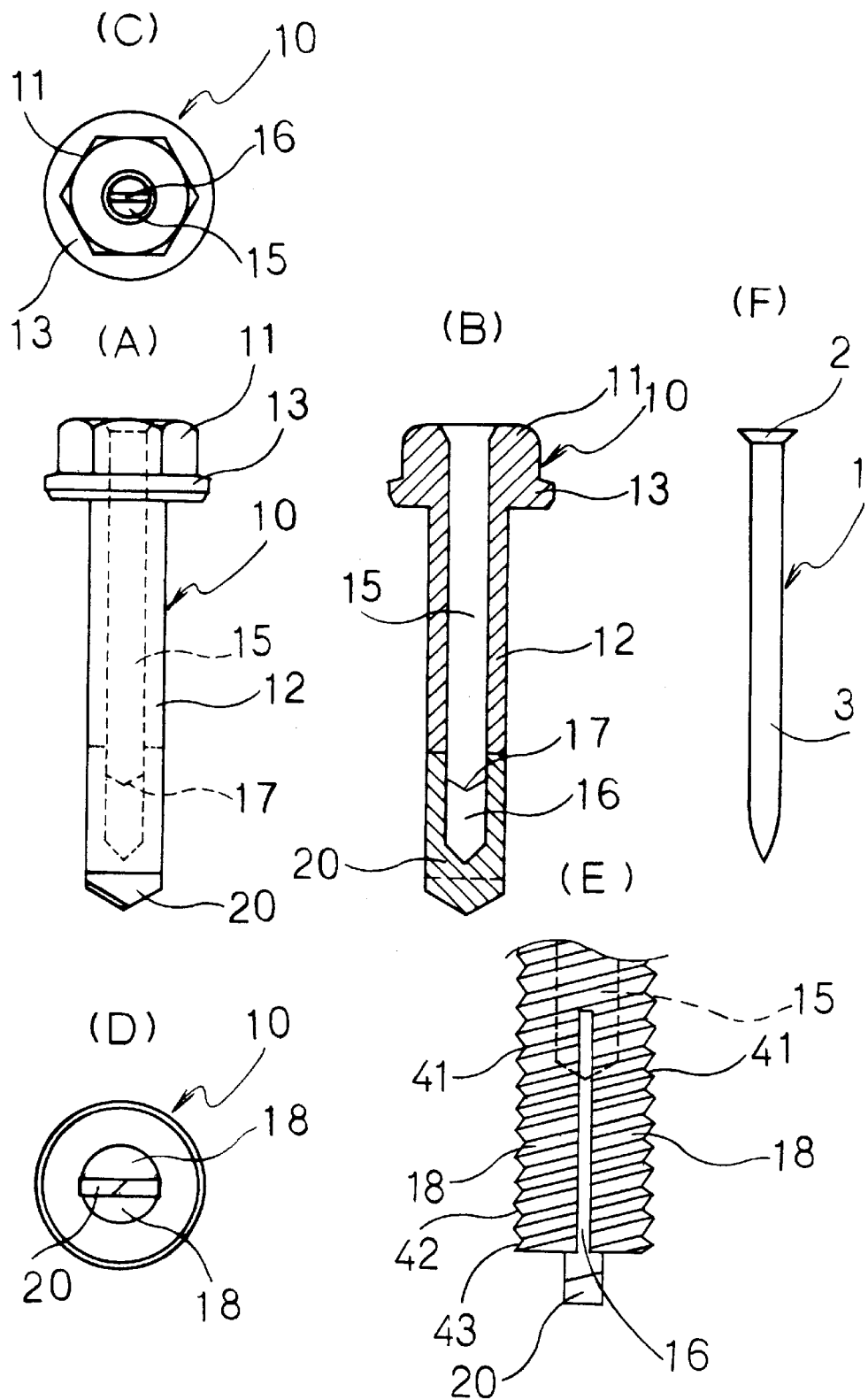
FIG. 1 shows one embodiment of the self-drilling anchor in accordance with the present invention; (A) is a front view of the body of the anchor, (B) a central longitudinal section view of the body, (C) a plan view of the body, (D) a bottom plan view of the body, (E) an enlarged side view of the top end portion of the body, and (F) a front view of a pin.

FIG. 1 depicts one embodiment of the self-drilling anchor in accordance with the present invention; (A) is a front view of a body 10 of the anchor, (B) a central longitudinal section view of the body 10, (C) a plan view of the body 10, (D) a bottom plan view of the body 10, (E) an enlarged side view of a top end portion of the body 10, and (F) a front view of a pin 1.

This specific self-drilling anchor comprises body 10 and pin 1. The body 10 is composed of a head 11 formed on the upper base end portion and a shank 12 extending from said head 11 downward, the shank 12 having a drilling edge 20 on its top end.

The head 11 is similar in shape to the head of a hexagonal bolt being hexagonal in its sectional contour which can be engaged with the rotary member of an electric rotary tool. The seating face is formed with a flange 13 having a larger diameter than that of head 11. This flange 13 is useful in subjecting a fixture to pressure for fixing purposes.

The shank 12 has a columnar shape having a constant outer diameter, and is formed with a helical groove portion 41 or channel portion on its outer periphery. The helical groove portion 41 or channel portion acts as an engagement member when the top end portion of shank 12 is spread to be securely fixed to a structure. Specifically, in FIG. 1(E), the helical groove portion 41 comprises a leading flank 42 and a trailing flank 43. The leading flank 42 is inclined at an acute angle to the axial core, while the trailing flank 43 is inclined at an obtuse angle to the axial core. Thus, when the top end portions 18, 18 of the shank have been spread, the face of the trailing flank 43 will become substantially horizontal for effective engagement with the structure. The groove portion 41 is not shown in the other drawings for brevity.

The helical groove portion 41 or channel portion as formed on the outer periphery of the shank 12 may additionally act as means to effectively evacuate chips etc., from a structure to which the self-drilling anchor is secured. Said helical groove portion 41 may have a leading angle larger than that of ordinary screws for the purpose of evacuation of chips etc. The helical groove portion is arranged such that it may extend to the base end portion of the shank 12.

The outer diameter of the shank 12 may be made smaller than the lateral width of the drilling edge 20 to perform effective discharge of chips.

The body 10 includes in its axial core an opening portion 15 formed constant in inner diameter and extending from the upper end of the head portion 11 to a position short of the top end of the shank 12. Numeral 17 represents a lower end portion of the hole portion 15 in FIG. 1. The lower end portion 17 is made pointed to guide the tip of a pin 1. The upper end of opening portion 15 is a little larger in its inner diameter to appropriately adapt to the head 2 of pin 1.

There is provided in the lower end portion of the shank 12 a slit 16 which may divide the lower end portion into two, namely within the plane including the center of the shank 12. The slit 16 is formed in such a manner that it will reach a portion of the opening portion 15.

The drilling edge 20 for use in drilling a fixture or a structure such as concrete is fit into part of the slit 16 for retention by the latter.

For retention, the drilling edge 20 may be brazed. In short, the drilling edge 20 merely has to be securely fixed to a certain part of the slit 16 by any possible means. Of course, the drilling edge 20 may only be forced into the slit 16. If the drilling edge 20 is subjected to brazing, the brazing strength is not so strong that the top ends 18, 18 of the shank 12 are not difficult to spread.

The pin 1 comprises head 2 formed on the upper base end portion and a shank 3 extending downward from the head 2. The outer diameter of head 2 is made larger than the shank 3 while the shank 3 is formed constant in its outer diameter with a pointed end.

A complete self-drilling anchor may be assembled by fitting the pin 1 into the opening portion 15 of the body 10.

Figure 2:
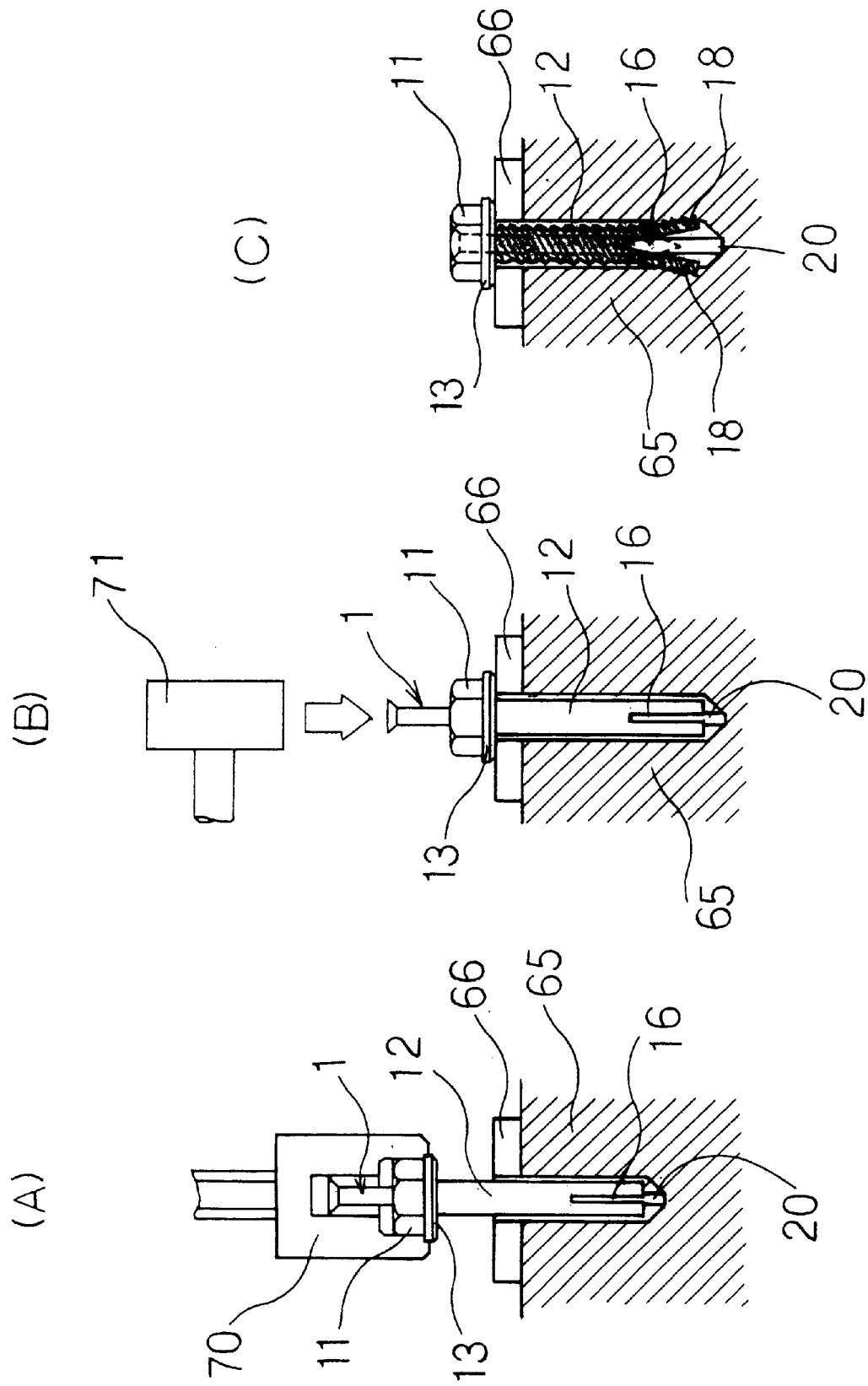
FIG. 2 is a schematic illustration of an example of use of the self-drilling anchor of FIG. 1; (A) illustrates the drilling state in which a self-drilling anchor is being driven, (B) the state in which the drilling operation has been completed, and (C) the state in which the anchor has been fixed by driving the pin.

FIG. 2 is a schematic illustration of an example of actual use of the self-drilling anchor; (A) shows the state in which the self-drilling anchor is being driven, (B) the state in which the drilling operation has been completed, and (C) the state in which the anchor is in a fixed position with a pin driven thereinside.

As shown in FIG. 2(A), at first, a fixture 66 or an object to be fixed is placed on a structure 65 such as concrete. Then the self-drilling anchor is driven into the fixture 66. During the driving operation, an electric rotary tool is used. The driving operation comprises engaging the driver bit 70 of this tool with the head 11, and boring the structure 65 such as concrete, bricks, blocks, etc. The fixture 66 and as the self-drilling anchor are rotated.

The rotary driving force may urge the drilling edge 20 equipped on the top end of the shank 12 to drill a starting hole into the fixture 66 and the structure 65.

Referring to FIG. 2(B), when the drilling of the starting hole is accomplished, the surface of the fixture 66 will be subjected to pressure by the lower side of the flange 13 which forms the seating face of the head 11. At this stage, the driver bit 70 of the electric rotary tool is removed from the anchor head portion 11. The head of the pin 1 protruding upward from the axial core of the head 11 is then stricken with a hammer 71 to allow the pin 1 to enter into the shank 12 of the anchor.

Referring to FIG. 2(C), upon being forced into the head portion 11 and the shank 12 of the anchor, the pin 1 is forcibly fitted in part into the slit 16 formed in the top end portion of the shank 12, thereby allowing the top end portions 18, 18 of the shank 12 to spread respectively. The spread leading end portions 18, 18 may lead the self-drilling anchor into permanent attachment with the structure. Simultaneously the fixture 66 is also securely fixed to the structure 65.

The groove portion formed on the outer periphery of the shank 12 is shown in FIG. 2(C), but not in the other drawings of FIG. 2 for brevity.

FIG. 3 shows drilling edges of different shapes; (A) is a front view of the drilling edge 20 in accordance with the above mentioned embodiment, (B) a side view of the same, (C) a front view of the drilling edge 31 in accordance with the other embodiment, and (D) a side view of the same.

Referring to FIGS. 3(A) and (B), the drilling edge 20 is plate-like and U-shaped as a whole in front view, comprising a thick section 21 formed with a cutting edge 28 in the lower topped portion and a thin section 22 for fitting in the slit 16 formed in the top end portion of the shank 12.

The thin section 22 has a cutout 23 of a proper length extending from the substantial center portion of its upper base end portion downward. The lateral width of cutout 23 is essentially equal to the inner diameter of the opening portion 15 opened in the shank 12 of the anchor, with its lower top end portion having a pointed shape. This may facilitate the intrusion of the top end portion of the pin 1 into the slit 16.

In this embodiment, step portion 24 located in the boundary between the thick and thin sections 21, 22, viz, a site abutted by the lower end portion of the shank 12 of the anchor is formed in such a manner that it will be positioned by a length N below the lower top end portion 26 of the cutout 23. In this connection, a part of the cutout 23 may be received by the slit 16 of the shank 12 of the anchor to such a degree that the drilling edge 20 may be prevented from breaking at the site of step 24.

Referring to FIGS. 3(C) and (D), a drilling edge 31 comprises a drilling portion 42 at the top end side and a plate-like thin section 22 at the base end portion side. The drilling portion 42 is not a plate-like member, but a tapered columnar member with a point, and having a cutting edge 48 extending from the lower leading end portion upward.

Said thin section 22 at the base end portion side, which is intended to be received by the slit 16 for retention, has a cutout 23 of a proper length extending downward from the substantial center portion of its upper base end portion. The configuration of the thin portion 22 is similar to that of the counterpart as shown in FIGS. 3(A) and (B).

Therefore, with the anchor using this drill edge 31, the shank 12 and the drilling edge 31 on its top end are formed in separate units, but a combination of both members may take the shape of an ordinary self-drilling screw in its entirety.

Figure 4:
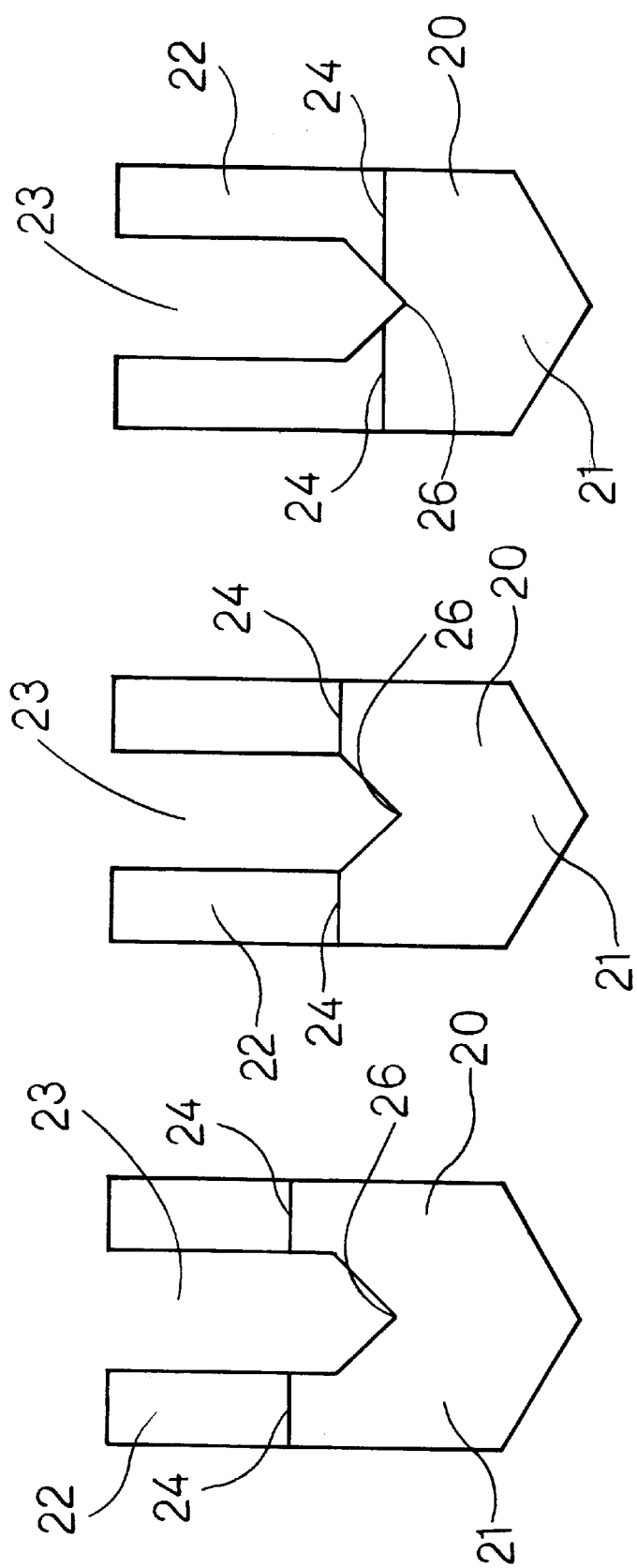
FIG. 4 is a front view showing three other variations of the drilling edge of the same configuration as in FIGS. 3(A) and (B)

FIG. 4 shows three other variations of a drilling edge that is similar in shape to the plate-like drilling edges 20 as shown in FIGS. 3(A) and (B). In these variations of drilling edges 20, step portions 24 which represent a boundary between the thin and thick sections 22, 21 are located above the lower end portion 26 of the cutout 23.

The three variations have a draw back in that the presence of the lower leading end portion 26 of the cutout 23 under the step portion 24 due to the abutment of the lower end portion of the shank 12 of the anchor on the step portion 24 may cause damage to the drilling edge at the site of the step portion 24.

Consequently, for the purpose of the best embodiment of the drilling edge 20, it would be very desirable that the step portion 24 be positioned below the lower top end portion 26 of the cutout 23 as in the embodiment shown by FIGS. 3(A) and (B).

The lower top end portion of the drilling edge 20 has a pointed shape in its center portion (FIG. 3(A)), wherein two cutting edge 28 are arranged in both sides of the pointed center portion.

The step portion 24, however, is not necessarily compulsory. In the absence thereof, there will be an arrangement such that the upper end portion of the slit 16 may abut on the upper base end portion of the drilling edge 20. However, if the slit 16 is made narrower, it will spread much wider when the pin 1 has been driven. Therefore narrower slit 16 is desirable. Such being the case, it would be preferable that only the part positioned at the upper base end portion side and received by the slit 16 of the shank 12 be made thinner, and that the lower leading end portion thicker, the strength of the drilling edge 20 being taken into account.

Figure 5:
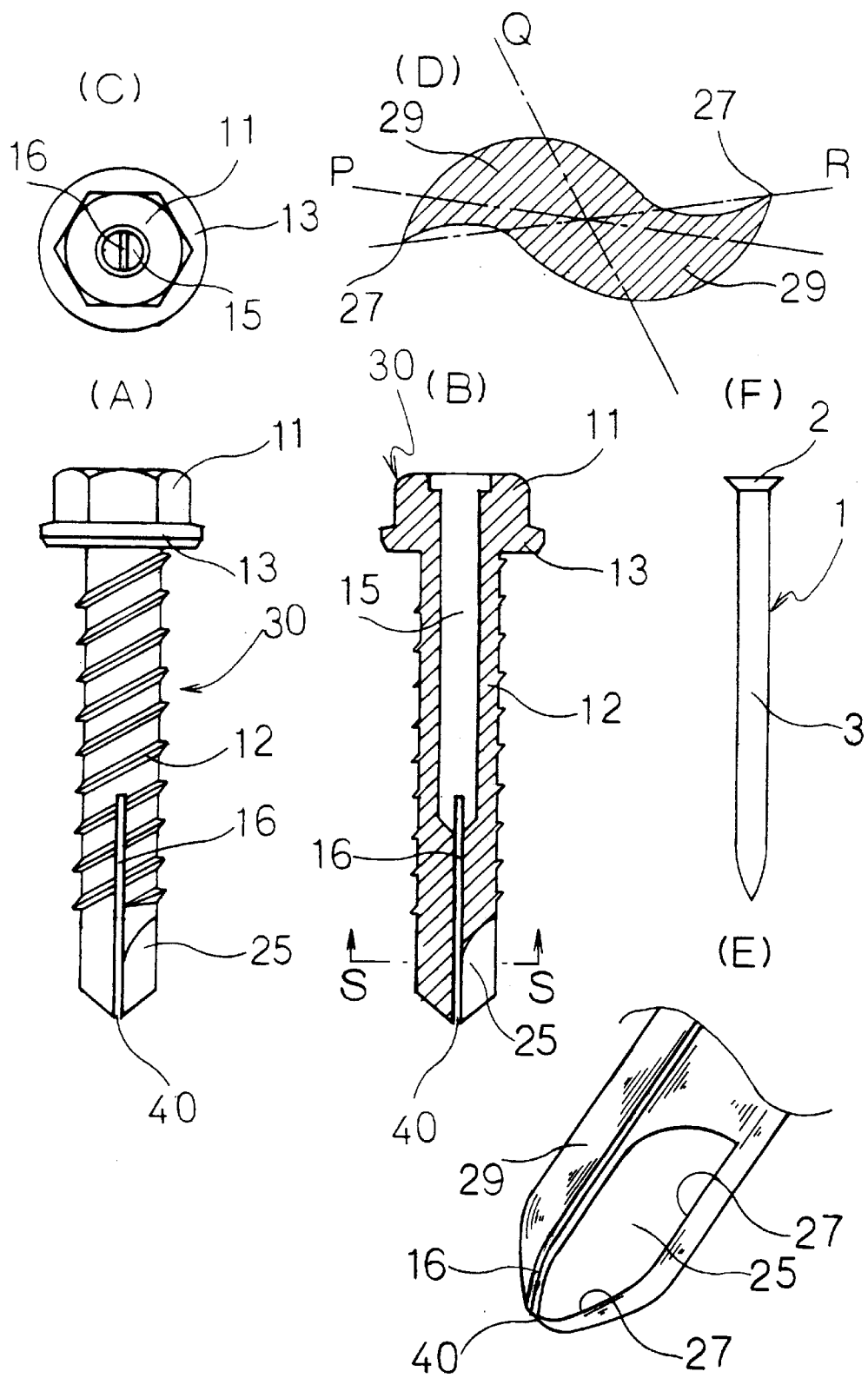
FIG. 5 shows another embodiment of the self-drilling anchor in accordance with the present invention; (A) is a front view of the anchor body, (B) a central longitudinal section view of the body, (C) a plan view of the body, (D) a sectional view taken on lines S—S of FIG. 5(B), (E) an enlarged perspective view of the top end portion of the body, and (F) a front view of a pin.

With the drilling edge 20, if there is provided a step portion 24 at the boundary between the thick section 21 of the lower top end portion and the thin portion 22 of the upper base end portion, the end portion of the drilling edge 20 at the base end portion side may not abut on the upper end portion of the slit 16. FIG. 5 illustrates another embodiment of the self-drilling anchor in accordance with the present invention; (A) is a front view of the body, (B) a central longitudinal section view of the body, (C) a plan view of the body, (D) a sectional view taken on lines S—S of FIG. 5(B), (E) an enlarged perspective view of the top end of the body, and (F) a front view of a pin.

This embodiment is different from the embodiment as shown in FIG. 1 in that a drilling edge 25 is formed directly in the top end portion of the shank 12 of a body 30. The rest of the arrangement is substantially the same as that of the embodiment shown in FIG. 1.

The body 30 has a head 11 on the upper base end portion, said head 11 being similar to the head of a hexagonal bolt in shape and having a flange 13 on the seating face thereof. A shank 12 of a constant diameter extends from the flange 13 downward and has a drilling edge 25 formed in the top end portion thereof. The head 11 and shank 12 include a common opening portion 15 extending therethrough the shank 12 is formed with a slit 16 in its top end portion, the slit 16 extending to reach a part of said opening portion 15. A perfect self-drilling anchor may be completed by the pin 1 being fitted into the opening portion 15.

The drilling edge 25 of this self-drilling anchor may be fabricated by plastic or cutting processing.

The drilling edge 25 may be made identical in shape to the conventional self-drilling screws.

Referring to the positioning of the slit 16, the slit 16 is preferably placed in position on a part of a land 29 located behind a cutting edge 27, e.g., a region between lines P and Q, as shown in FIG. 5(D). The slit 16 may also be provided in a plane including the cutting edge 27 (the plane as depicted by a line R).

With this specific embodiment, in order to avoid any possible reduction of the effect of a chisel point 40 on the tip of the drilling edge 25 (FIGS. 5(A) and (B)), the slit 16 may not be provided in the site of the top end of the shank 12. That is, the slit 16 may be so formed as to extend from the position slightly above the top end of the shank 12 to the opening portion 15.

In this self-drilling anchor, the shank 12 may be made smaller in outer diameter than the drilling edge 25 on the top end portion.

The shank 12 may be formed on its outer periphery with helical grooves or channels for evacuation of chips, or threads for tapping purposes.

The drilling edge 25 may be produced by any proper process such as a pinch-point process after formation of a slit 16. In this case, the cavity of the slit 16 may be crashed due to the pinch-point process after the slit formation, thus resulting in the slit 16 being reduced to zero with its cavity, but the slit 16 itself remains in a depth of cut so that the top end portions 18, 18 may open wide without any difficulty. Such a process by which a drilling edge 25 is produced makes it so difficult to establish a slit 16 on the position where the land 29 in the drilling edge 25 is placed that no exact position can be specified. Nevertheless, since the slit 16 may lose its cavity and be substantially reduced to zero, this would pose no problem even if the slit 16 were placed in any position.

Figure 6:
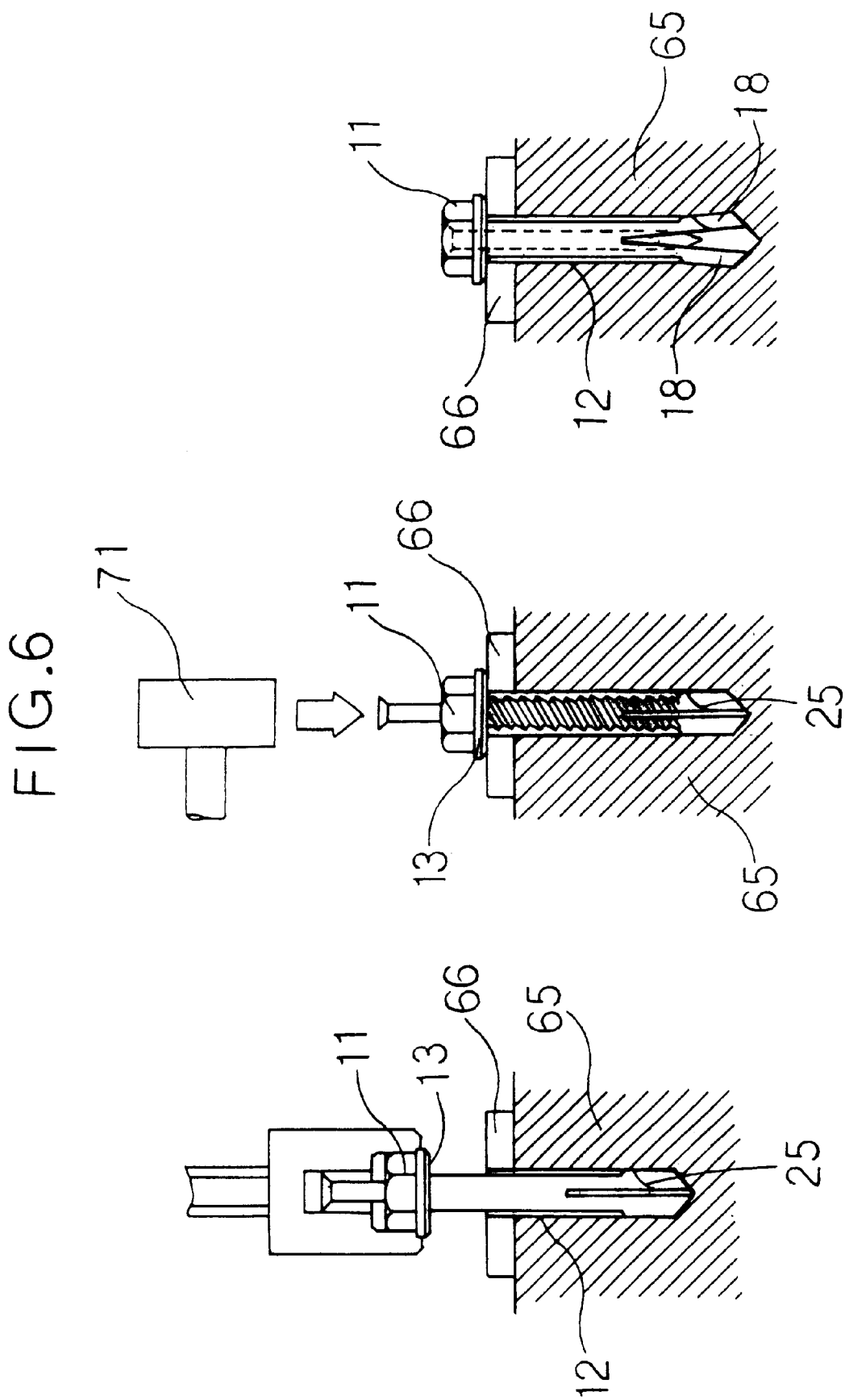
FIG. 6 is a schematic illustration of an example of use of the self-drilling anchor as shown by FIG. 5.

FIG. 6 is a schematic illustration of an example of use of this self-drilling anchor.

In a drawing at the left hand in this figure, the self-drilling anchor is in rotary motion by an electric rotary tool. The self drilling anchor is first driven into a fixture 66 disposed on a structure 65 such as concrete.

The drilling edge 25 is provided on the tip of the shank 12 and is urged by this rotary driving force to gradually drill a starting hole into the fixture 66 and the structure 65.

In a central drawing of this figure, the starting hole drilling is finished with the result that the surface of the fixture 66 comes under pressure by the lower side of the flange 13 which forms a seating face of the head 11. The head of a pin 1 projecting from the axial core of the head 11 downward is stricken by a hammer 71 to introduce the pin 1 into the shank 12 of the anchor.

Finally, in a drawing at the right hand in this figure, as soon as the pin 1 has penetrated the anchor to the hilt, the tip of the pin 1 forcibly fits into the slit 16 formed in the top end portion of the shank 12 so as to spread the top end portions 18, 18 of the shank 12 until the fixture 66 is securely fixed to the structure 65.

In FIG. 6, helical threads on the outer periphery of the shank 12 are shown only in the central drawing, but not in the other drawings for brevity.

Figure 7:
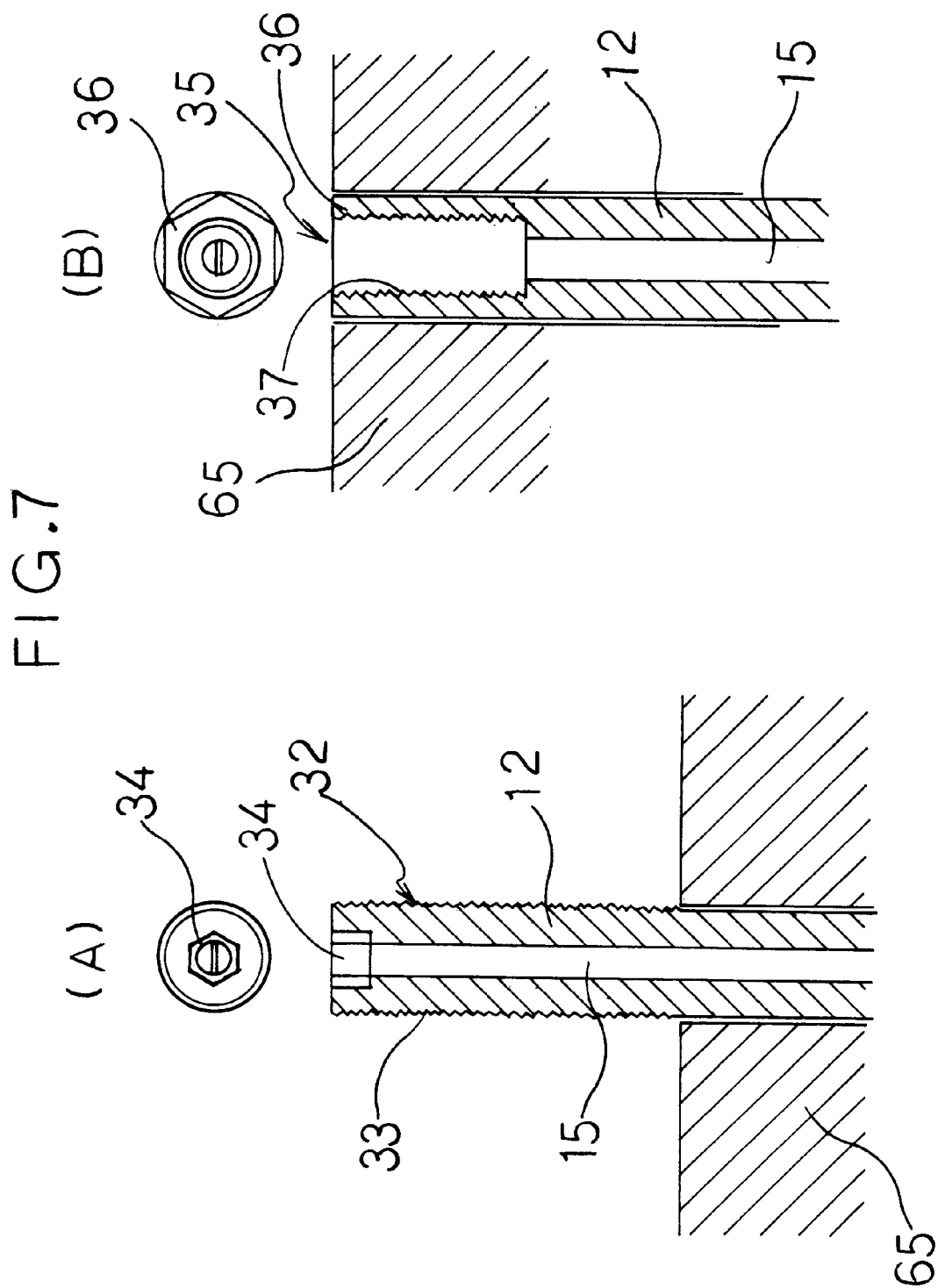
FIG. 7 shows two further embodiments of the self-drilling anchor in accordance with the present invention, highlighting a part of the upper base end portion of its shank; (A) depicts the shank of one embodiment drawn on a plane on one hand and in a central longitudinal section on the other hand, and (B) the shank of the other embodiment drawn on a plane on one hand and in a central longitudinal section on the other hand.
Figure 8:
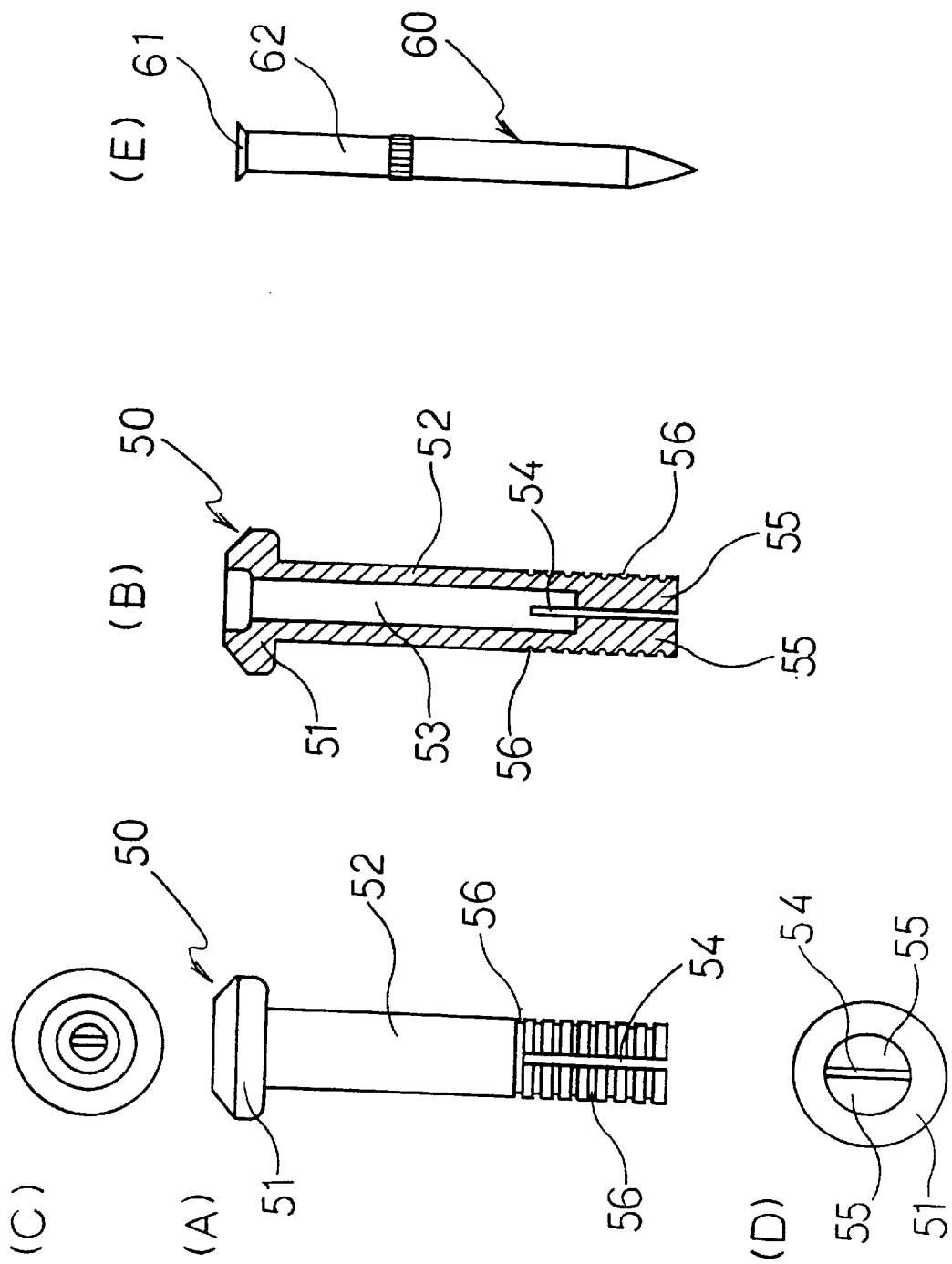
FIG. 8 shows a conventional anchor pin; (A) is a plan view, (B) a central longitudinal section view, (C) a plan view, (D) a bottom plan view, and (E) a front view of a pin.

FIG 7 shows further embodiments of the self-drilling anchor in accordance with the present invention, this embodiment being different from the aforementioned embodiment in the construction of the upper base end portion of the shank.

With these embodiments, the anchor body itself does not include a head.

FIG. 7(A) depicts a plan view and a partial central longitudinal section view, omitting illustration of the lower top end portion of the anchor.

This anchor has a body 32 including a shank 12 having threads 32 formed on its outer periphery at the base end portion side. An engagement opening portion 34 is formed in the end face of the base end portion of the shank 12 for engaging with the rotary member of an electric rotary tooling.

The top end portion side of the shank 12 is not shown because it has the same form as in the above-described embodiment.

The use of this anchor will be described by way of example.

The anchor body 32 is placed in rotary motion by the electric rotary tool that is connected by its rotary member with the engagement opening portion 34 opened on the base end portion of the shank 12. The anchor body 32 is then driven from a fixture (not shown) into the structure 65. After the anchor has been inserted by a desired depth, a pin is fitted into the opening portion 15 of the axial core of the anchor, being subjected to striking energy until the anchor is securely fixed to the structure. In addition, the fixture may be secured to the structure by fitting a nut onto the threads 33 formed on the outer periphery of the shank 12 at the base end portion side.

FIG. 7(B) depicts a plan view and a partial central longitudinal section view of a further embodiment of the self-drilling anchor, omitting illustration of the lower top end portion of the anchor.

In this anchor, a body 35 is includes a shank 12, with its upper base end portion 36 having a hexagonal section and so designed as to engage with the rotary member of an electric rotary tool. A threaded hole 37 is formed extending from the upper end of the base end portion 36 down to a certain depth. An opening portion 15 into which a pin is inserted will originate from the bottom side of this threaded hole 37.

The top end portion side of the shank 12 is not shown because it has the same form as in the aforementioned embodiments.

An example of use of this anchor is as follows.

First, the body 35 of the anchor is placed in rotary motion by an electric rotary tool which is connected by its rotary member with the base end portion 36 of the shank 12. The body 35 is then driven from a fixture (not shown) into a structure 65. After the body 35 of the anchor has been inserted into the structure, by a desired depth a pin is fitted into the opening portion 15 of the axial core of the anchor. The pin is subjected to striking energy until it is securely fixed to the structure. In addition, the fixture is securely fixed to the structure by fitting a bolt (not shown) into the threaded hole 37 of the base end portion 36 of the shank 12.

Though the preferred embodiments have been described so far, the following variations are available for the present invention.

The present invention may do without provision of the head 11 on the base end portion of the anchor body, as shown by way of example in FIG. 7.

The flange 13 may not be provided on the seating face of the head 11.

The present invention may be embodied if head 11, engagement opening portion 34 on the base end portion of the shank 12, and the base end portion 36 of the shank 12 are of square or other different shapes rather than hexagonal shape in sectional contour.

The head 11 may be of disc or circular shape in contour, and a disc-shaped head or a circular head may be provided with an engagement opening portion having any of different contours, or a cross groove or slitting so that it will be properly engaged with the rotary member of the electric rotary tool. In the case, a head of any shape may be usable.

The length and outer diameter of the shank 12, the length and inner diameter of the opening portion 15, the length and cavity width of the slit 16, and the outer diameter and length of the pin 1 may be freely designed.

The pin 1 with no head 2 is available for the present invention.

All that is important is to form a slit 16 so as to extend from the tip of the shank 12 to the opening portion 15, preferably with a predetermined length of part of the slit 16 being provided in a part of the opening portion 15.

The shape, thickness or size of drilling edges 20, 31 may be freely designed as needed, and as aforementioned, it is desirable that the top end portion 26 of cutout 23 be positioned above the step portion 24.

As described above, the step portion 24 may not be provided in the drilling edge 20, but a part to be received by the slit 16 for retention is preferably made thinner. The other part at the top end portion side is made thicker in order to form step portion 24 between both parts, in consideration of the cavity width of the slit 16 or the strength of the drilling edge 20.

In the above mentioned embodiment, a single slit 16 is provided so as to divide its top end portion into two at the tip of the shank and the plane including the center of the shank, but its top end portion may also be divided into four or more than five. In addition, more than two slits may be used.

A thread for tapping application may be formed in a part or the whole of the outer periphery of the anchor shank 12.

It is free to form on the outer periphery of the anchor shank 12 annular grooves or channels as an engagement member for providing an effective fixation to structures.

It is also free to provide on the periphery of the anchor shank 12 helical grooves or channels for evacuating chips from the structures.

The outer diameter of shank 12 of the anchor may be made smaller than the width or outer diameter of the drilling edge to allow chips from the structure to go away easily.

The present invention composed of the above-described embodiments incorporates the following effects.

In the first and second aspects of the present invention the provision of a drilling edge on the tip of the anchor shank enables drilling a starting hole in the structure as well as the fixture by driving the anchor as it is afforded a turning effort by an electric rotary tool, thereby avoiding the necessity of opening a starting hole in advance in the fixture and structure using the electric rotary tool as was commonly practiced in the conventional anchoring operations.

Since a starting hole may be drilled into the structure together with the fixture, no adjustment for exact positional correspondence between the fixture and the structure is required in the anchoring operation.

Thus, the present invention may simplify the operation, require limited skills, and contribute to reduce the operation time.

In this third aspect of the present invention an effective drilling of a starting hole into the fixture and structure may be achieved by a drilling edge held by the slit, and no adjustment to secure exact positional correspondence between the fixture and the structure is needed, as in the above mentioned invention.

When a pin is inserted after the hole drilling, the presence of a cutout formed on the drilling edge may allow the pin to intrude into the slit without any trouble.

Because the cutout provided on the drilling edge is positioned within the slit of the shank, the strength of the drilling edge may be sufficiently guaranteed. This may eliminate the risk that the drilling edge is likely to be broken by the top end portion of the shank.

In the first and second aspect of the present invention in addition to the fact that there is the same effect as the formation of a drilling edge directly on the tip of the shank may preclude the operation of combining a drilling edge formed in a separate member with the shank of the anchor, as in the second and third aspects of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A self-drilling anchor comprising:

a shank;

an opening portion formed in a core of the shank extending from a base end portion of the shank toward a top end portion of the shank by a length sufficient for receiving a pin;

a slit formed in the top end portion of the shank extending from a tip to said opening portion, whereby the self-drilling anchor may be securely fixed to a structure by fitting the pin into said opening portion and driving the pin until the slit is spread;

the base end portion of the shank is engageable with the rotary member of a rotary tool;

the shank has drilling edges at the top end portion thereof said drilling edges are formed between the tip of the shank and an end of said slit adjacent said opening portion; and said drilling edges are for drilling a starting hole into the structure by rotary motion from the rotary tool.

2. The self-drilling anchor as defined in claim 1, wherein said drilling edges are formed directly in the top end portion of the shank and integral therewith.

3. The self-drilling anchor as defined in claim 1, wherein the shank includes a head formed on the base end thereof, said head is formed into a hexagonal bolt shape.

4. A self-drilling anchor comprising:

a shank;

an opening portion formed in a core of the shank extending from a base end portion of the shank toward a top end portion of the shank by a length sufficient for receiving a pin;

a slit formed in the top end portion of the shank extending from a tip to said opening portion, whereby the self-drilling anchor may be securely fixed to a structure by fitting the pin into said opening portion and driving the pin until the slit is spread;

the base end portion of the shank is engageable with the rotary member of a rotary tool;

drilling edges received for retention by the slit formed in the top end portion of the shank, said drilling edges forming a part of the anchor structure; and said drilling edges are for drilling a starting hole into the structure by rotary motion from the rotary tool.

5. The self-drilling anchor as defined in claim 2, further comprising:

the drilling edges have cutting edges formed in a lower portion of the top end portion;

a cutout is formed in an upper portion of the base end portion extending from a substantially central portion downward; and the drilling edges are received at the base end portion side by the slit for retention to allow the cutout to position within the slit, whereby a top end portion of the pin may intrude into the cutout.

6. The self-drilling anchor as defined in claim 2, wherein the shank includes a head formed on the base end thereof, said head is formed into a hexagonal bolt shape.

7. A self-drilling anchor comprising:

a shank;

an opening portion formed in a core of the shank, said opening portion extending from a base end portion of the shank toward a top end portion of the shank by a length sufficient for receiving a pin;

a slit formed in the top end portion of the shank, said slit extending toward said opening portion, whereby the self-drilling anchor may be securely fixed to a structure by fitting the pin until the slit is spread;

the base end portion of the shank is engageable with the rotary member of a rotary tool; and drilling edges formed in the top end portion of the shank, said slit extends between adjacent of said drilling edges.

8. The self-drilling anchor as defined in claim 7, wherein the shank includes a head formed on the base end thereof, said head is formed into a hexagonal bolt shape.

9. The self-drilling anchor as defined in claim 7, wherein said top end of said shank terminates in said drilling edges to a point, said slit extends to said point of said shank.

* * * * *